United States Patent [19]

Toth

[11] Patent Number: 5,090,088
[45] Date of Patent: Feb. 25, 1992

[54] DECK-MOUNTED LEAF BLOWER

[76] Inventor: John S. Toth, 309 Mariellen Ave., Mishawaka, Ind. 46544

[21] Appl. No.: 683,864

[22] Filed: Apr. 11, 1991

[51] Int. Cl.⁵ ............................................. E01H 1/08
[52] U.S. Cl. .................................... 15/405; 15/354
[58] Field of Search ............... 15/354, 405, 330, 338

[56] References Cited

U.S. PATENT DOCUMENTS

| | | | |
|---|---|---|---|
| 2,675,660 | 4/1954 | Barnard | 56/25.4 |
| 3,319,363 | 5/1967 | Kennedy | 37/43 |
| 3,363,278 | 1/1968 | Davidson | 15/405 |
| 3,863,291 | 2/1975 | Woelffer | 15/328 |
| 3,959,846 | 6/1976 | Yasuda | 15/405 X |
| 3,968,938 | 7/1976 | Ruhl et al. | 15/330 X |
| 4,076,460 | 2/1978 | Roof | 15/330 X |
| 4,118,826 | 10/1978 | Kaeser | 15/328 |
| 4,279,056 | 7/1981 | Jacobson et al. | 15/405 X |
| 4,318,203 | 3/1982 | Satoh et al. | 15/344 |
| 4,451,951 | 6/1984 | Satoh | 15/330 |
| 4,597,203 | 7/1986 | Middleton | 37/241 |

FOREIGN PATENT DOCUMENTS

| | | | |
|---|---|---|---|
| 2256875 | 5/1973 | Fed. Rep. of Germany | 15/405 |
| 471314 | 5/1952 | Italy | 15/405 |

Primary Examiner—Chris K. Moore
Attorney, Agent, or Firm—James D. Hall

[57] ABSTRACT

A leaf blower which includes an axial fan secured to the generally horizontal drive shaft of a motor carried upon a wheel-mounted deck. The deck is guided over the ground by a handle which allows the user of the leaf blower to direct the air flow from the axial fan across the surface of the ground. The wheels of the deck are adjustable to allow for the height and angle of incline of the fan relative to the ground to be varied for optimum leaf blowing.

2 Claims, 1 Drawing Sheet

DECK-MOUNTED LEAF BLOWER

BACKGROUND OF THE INVENTION

This invention relates to a leaf blower having particular application to a fan device mounted to a deck which includes wheels for movement over the ground. Leaf blowers are commonly used lawn care items which take the form of electric and gasoline-powered blowers either carried by the user or mounted upon wheels and guided over the ground by the user. Examples of wheel-mounted blowers which are guided over the ground are found in U.S. Pat. Nos. 2,675,660 and 4,118,826. Such blowers have the air flow directed through a nozzle-type opening adjacent to ground level.

SUMMARY OF THE INVENTION

This invention relates to a leaf blower which includes an axial fan driven about a generally horizontal axis by a motor mounted to a deck which, in turn, is carried upon wheels for guided passage across the ground. The wheels for the deck are preferably adjustable so as to allow variations in the height that the fan is positioned above the ground and the angle of inclination of the fan relative to the ground. This allows the user of the leaf blower to adjust the direction of air flow across and toward the ground for optimum leaf blowing. The fan is also preferably enclosed with a peripheral shroud for obvious safety reasons as well as providing the directional control of the blown air.

Accordingly, it is an object of this invention to provide a leaf blower which utilizes an axial fan and which is carried upon a wheel-mounted deck.

Another object of this invention is to provide a leaf blower which is of economical construction and of efficient operation.

Still another object of this invention is to provide a leaf blower of simplified operation.

Other objects of this invention will become apparent upon a reading of the following description.

DESCRIPTION OF THE PREFERRED EMBODIMENT

Figure 1:
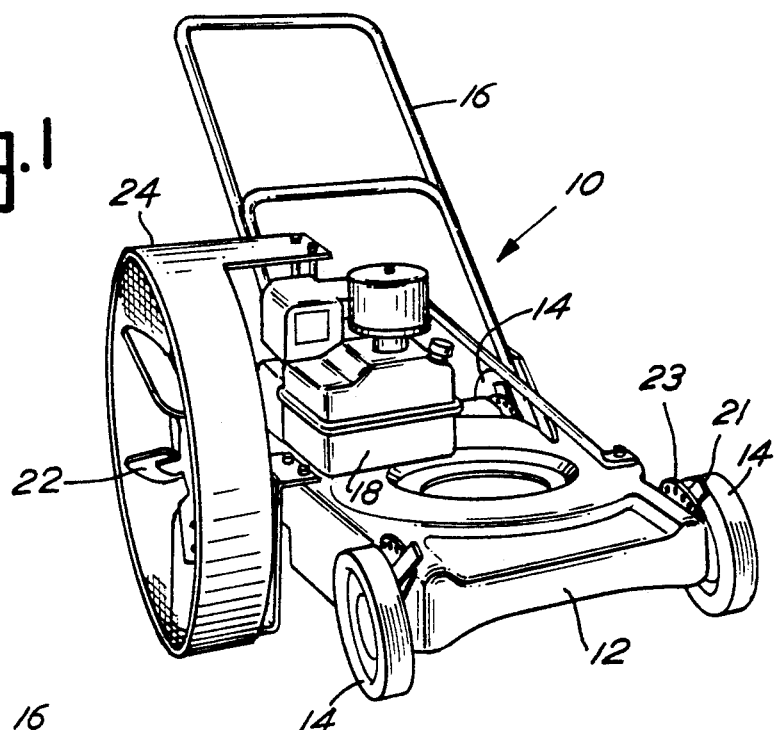
FIG. 1 is a perspective view of the invention as seen from the front and right side.
Figure 2:
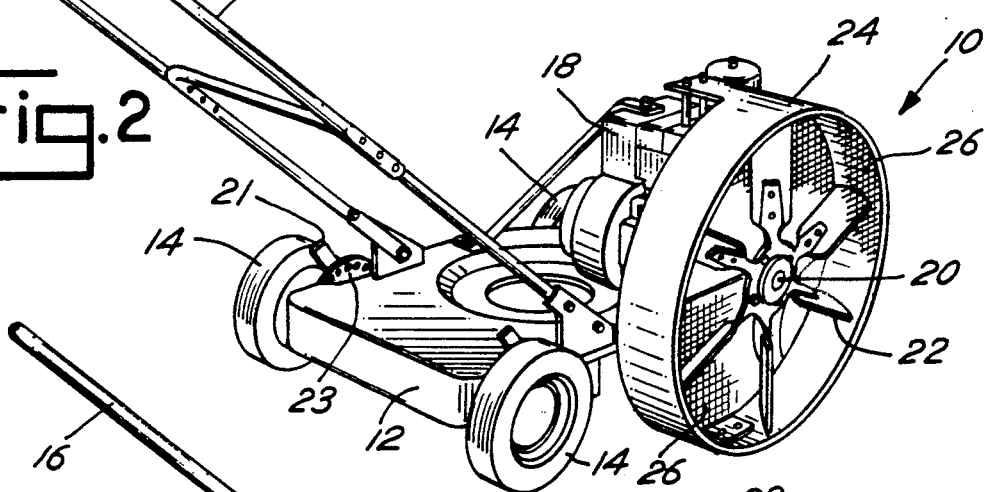
FIG. 2 is a perspective view of the invention as seen from the rear and right side.
Figure 3:
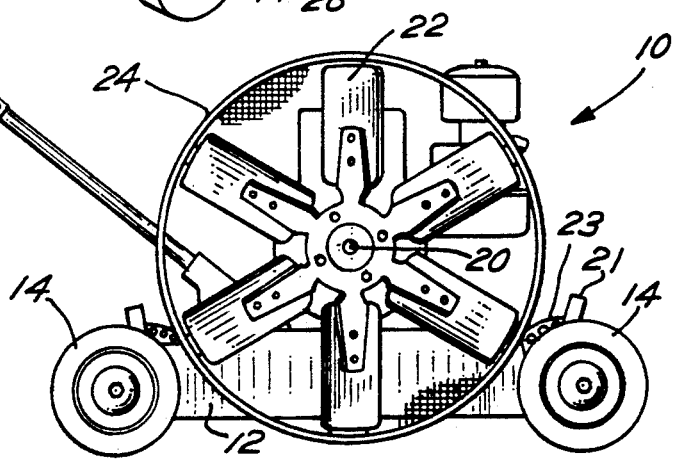
FIG. 3 is a side elevational view as seen from the right side.

The preferred embodiment illustrated is not intended to be exhaustive or to limit the invention to the precise form disclosed. It is chosen and described in order to best explain the principles of the invention and its application and practical use to enable others skilled in the art to best utilize the invention.

Leaf blower 10 includes a deck 12 to which are mounted four wheels 14. A handle 16 is connected to deck 12 and is used to guide the deck across the ground.

Carried upon deck 12 is a motor 18 having a horizontal drive shaft 20. Wheels 14 are adjustable relative to deck 12 so as to selectively vary the height of the deck above the ground. The manner in which wheels 14 can be adjusted is in common use, such as for power mowers, and may be of the type in which the axial of each wheel is threaded into one of a plurality of vertically aligned threaded bores in the deck or of the type in which the axial of each wheel is carried upon a bracket 21 which is pivotally connected to the deck. Selected pivotal movement of each bracket for engagement with a deck connected plate 23 causes movement of the wheel axial to cause a variation in the vertical position of the axis relative to the deck.

Blower 10 as thus far described finds similarity in components to the ordinary push or self-propelled lawn mower. Instead of the motor shaft being located in its common vertical orientation extending below the mower deck to where the cutter blade is attached as in mowers, in this invention drive shaft 20 of motor 18 is horizontally oriented, protruding laterally relative to deck 12. Attached to drive shaft 20 is an axial, multiple-blade fan 22. Surrounding fan 22 is a circular, peripherally located shroud 24. Shroud 24 is secured to motor 18 and to deck 12. While leaf blower 10 is illustrated as a push device, requiring the user to push deck 12 over the ground, it is to be understood that a self-propelled deck could also be utilized with motor 18 providing driving power to wheels 14, thus creating a self-propelled type of blower. Screens 26 cover each side of fan 22 for safety reasons.

In operation, blower 10 is guided over the lawn or ground with motor 18 driving fan 22, causing air to be propelled through shroud 24 in a direction laterally outwardly relative to deck 12. The blown air created by fan 22 contacts the leaves upon the ground and blows or herds the leaves. The distance that fan 22 is located above the ground can be varied by varying the height of deck 12 relative to wheels 14. Additionally, deck 12 and thus fan 22 can be angled relative to the ground by raising the wheels on one side of the deck higher than the wheels on the fan side of the deck. As such, the adjustability of wheels 14 can serve to allow the user of the leaf blower to position the fan relative to the ground in order to provide an optimum delivery of air to the leaves.

The invention is not to be limited to the details above given but may be modified within the scope of the appended claims.

What I claim is:

1. A leaf blower comprising a deck, wheels supported upon said deck for movement over the ground, a handle means connected to said deck for guiding said deck over the ground, a motor carried by said deck, said motor having a horizontal drive shaft, an axial fan secured to said drive shaft for rotation about a horizontal axis to blow air in a direction generally parallel to said axis, said fan being located adjacent the level of said wheels, a generally cylindrical shroud extending about said fan, said wheels consisting of two pairs, each wheel pair located on opposite sides of said deck, said fan located at one of said deck sides, one of said wheel pairs being independently adjustable relative to the other of said wheel pairs in a vertical orientation relative to said deck to incline the deck and said fan relative to the ground.

2. The leaf blower of claim 1 wherein said wheels are independently adjustable to incline said deck and fan relative to said ground.

* * * * *